United States Patent
Boie

[11] Patent Number: 5,930,306
[45] Date of Patent: Jul. 27, 1999

[54] DEVICE FOR CORRECTING PHASE NOISE IN A DIGITAL RECEIVER

[75] Inventor: Werner Boie, Strasbourg, France

[73] Assignee: Thomson multimedia SA, France

[21] Appl. No.: 08/797,910

[22] Filed: Feb. 10, 1997

[30] Foreign Application Priority Data

Feb. 16, 1996 [FR] France .................................. 96 01923

[51] Int. Cl.⁶ .............................. H04L 27/22; H04L 1/00; H03D 3/00; H04B 1/10

[52] U.S. Cl. .......................... 375/332; 375/346; 329/307; 455/310

[58] Field of Search ..................................... 375/346, 285, 375/332, 330, 226, 279; 329/306, 307; 455/63, 310

[56] References Cited

U.S. PATENT DOCUMENTS

| | | | |
|---|---|---|---|
| 3,787,775 | 1/1974 | Lanning | 329/308 |
| 4,359,692 | 11/1982 | Ryan | 375/336 |
| 4,689,804 | 8/1987 | Srinivasagopalan et al. | 375/346 |
| 4,918,748 | 4/1990 | Shahriary et al. | 455/315 |
| 5,109,532 | 4/1992 | Petrovic et al. | 455/63 |
| 5,584,062 | 12/1996 | Meador et al. | 455/260 |

OTHER PUBLICATIONS

Patent Abstracts of Japan, vol. 912, No. 367 (E–664), Sep. 30, 1988 & JP–A–63 119306 (Hitachi LTD; Others: 01), May 24, 1988.

Copy of Search Report.

*Primary Examiner*—Don N. Vo
*Assistant Examiner*—Albert Park
*Attorney, Agent, or Firm*—Joseph S. Tripoli; Peter M. Emanuel; Kuniyuki Akiyama

[57] ABSTRACT

A digital receiver includes a mixer stage receiving a carrier signal S(t) and delivering an intermediate frequency signal $S_{FI}(t)$ to a demodulation stage. The mixer stage is furnished with a PLL circuit for generating a signal at a given frequency. The digital receiver further includes a phase noise digital correction stage for tapping off a noise signal $\phi_n(t)$ generated by the PLL circuit in the mixer stage and for compensating the noise signal $\phi_n(t)$ in the demodulation stage.

4 Claims, 2 Drawing Sheets

DEVICE FOR CORRECTING PHASE NOISE IN A DIGITAL RECEIVER

FIELD OF THE INVENTION

The present invention lies in the field of digital transmissions of information and relates particularly to a digital receiver including a mixer stage receiving a carrier S(t) and delivering to a demodulation stage an intermediate-frequency signal $S_{FI}(t)$ obtained by combining the carrier received and a signal $S_{Lo}(t)$ with angular frequency $\omega_{Lo}$, generated by a PLL circuit.

BACKGROUND OF THE INVENTION

In receivers of this type, the PLL circuit is generally the source of phase noise which gets added to the signal $S_{FI}(t)$ and which causes a deterioration in the quality of the information transmitted. Thus, excessive phase noise increases the error rate in the demodulated signal especially in transmission devices which use QPSK modulation (Quadriphase shift keying) or modulation of the QAM type (Quadrature amplitude modulation).

FIG. 1 represents diagrammatically a phase-locked loop circuit used in known receivers. The total phase noise generated by such a circuit results from the contribution from its constituent elements such as a reference oscillator, a voltage-controlled oscillator VCO, a phase detector, a filtering operational amplifier and sometimes a divider. Generally, the VCO is regarded as constituting the major source of phase noise. Thus, this element includes a variable-capacitance diode (or varactor) having an equivalent resistance which causes a noise voltage producing modulation of the voltage across the terminals of the said varactor. This noise prevails in the VCO over a wide range of frequencies of oscillation.

The objective of the invention is to eliminate the phase noise generated by the PLL circuit in digital receivers.

According to the invention, the digital receiver includes a phase noise digital correction stage intended for tapping off the noise signal $\phi_n(t)$ generated by the PLL circuit in the mixer stage and for compensating the said noise $\phi_n(t)$ in the demodulation stage.

By virtue of the noise correction stage, the demodulated signal is error-free thus enabling the quality of the information transmitted to be improved.

BRIEF DESCRIPTION OF THE DRAWINGS

Other characteristics and advantages of the invention will emerge from the description which follows, taken by way of non-limiting example, with reference to the appended figures in which.

DESCRIPTION OF THE PREFERRED EMBODIMENT

Figure 3:
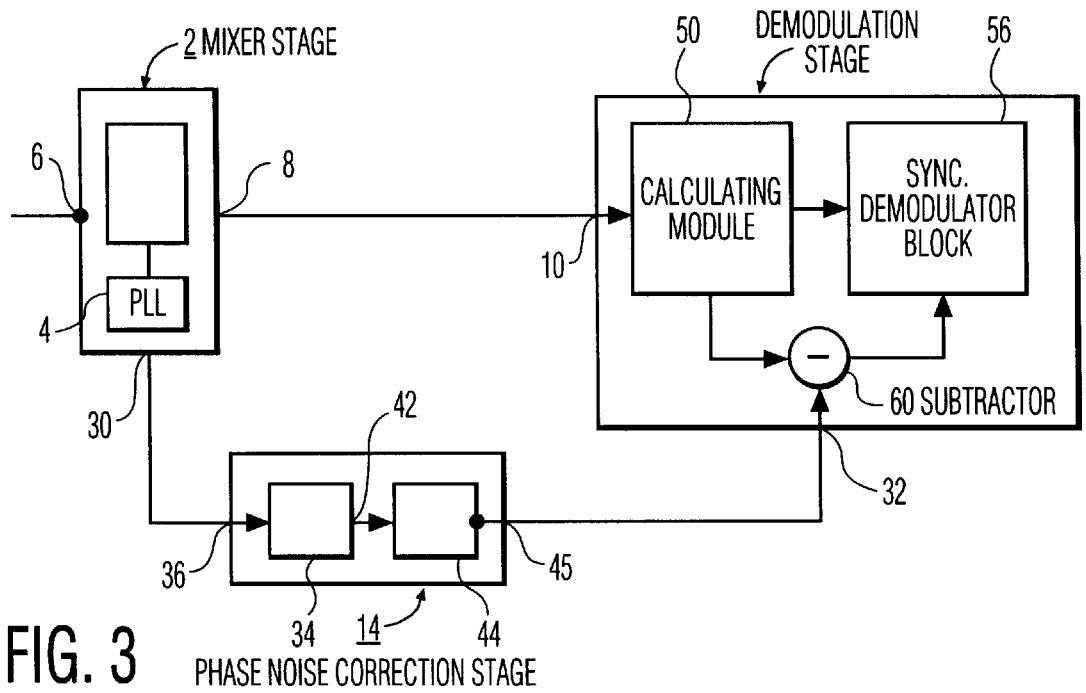
FIG. 3 represents a block diagram of a receiver according to the invention.
Figure 4:
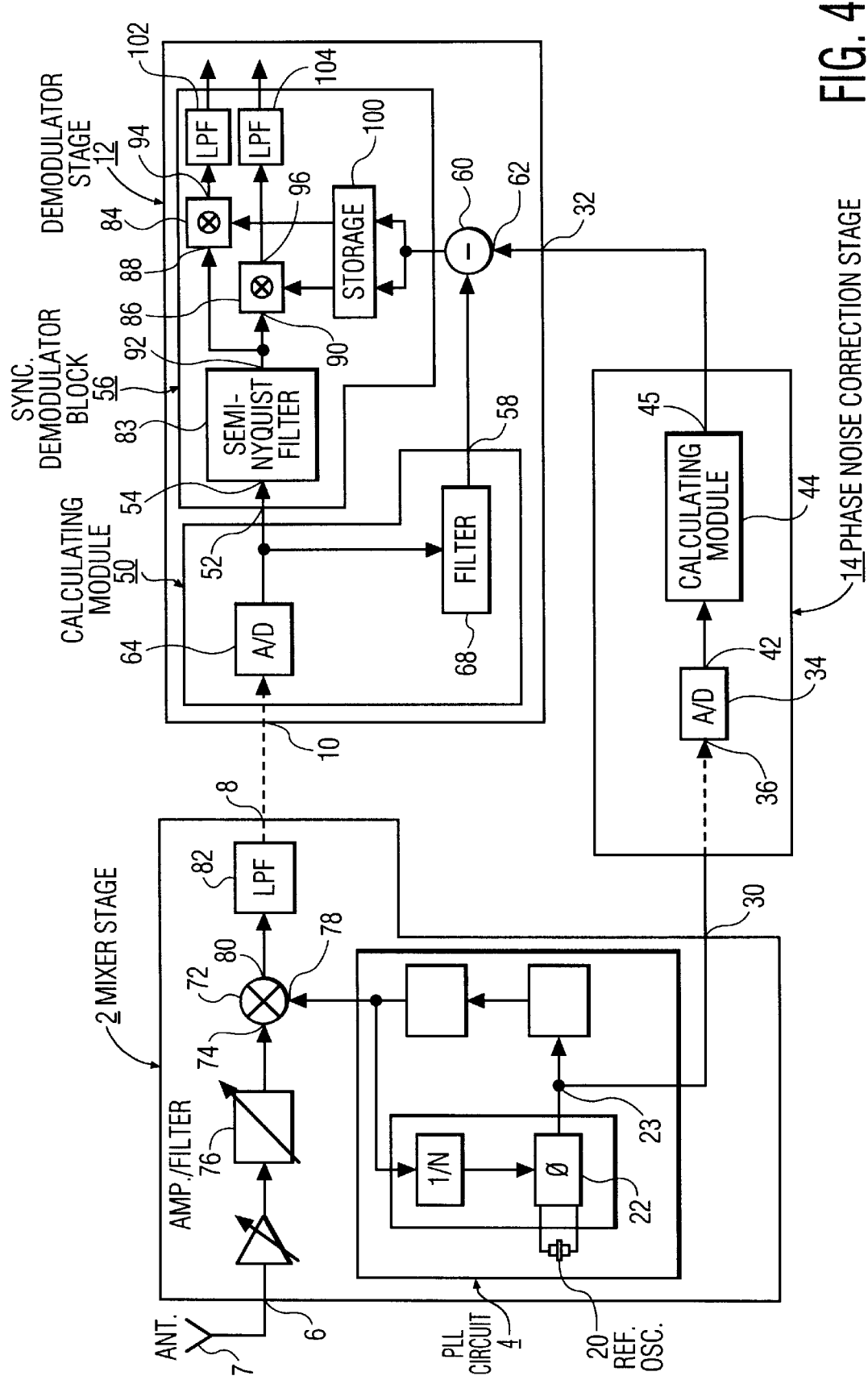
FIG. 4 represents a receiver according to a preferred embodiment of the invention.

As may be seen in FIGS. 3 and 4, the digital receiver includes a mixer stage 2 furnished with a phase-locked loop (PLL) circuit 4. An input 6 of the said mixer stage 2 receives a modulated carrier S(t) delivered by an antenna 7 and a first output 8 of the mixer stage 2 delivers an intermediate-frequency signal $S_{FI}(t)$ to a first input 10 of a demodulation stage 12.

According to a first essential characteristic of the invention, the digital receiver furthermore includes a phase noise correction stage 14 intended for tapping off a noise signal $\phi_n(t)$ generated by the PLL circuit 4 in the mixer stage 2 and for compensating the said noise $\phi_n(t)$ in the demodulation stage 12.

Figure 1:
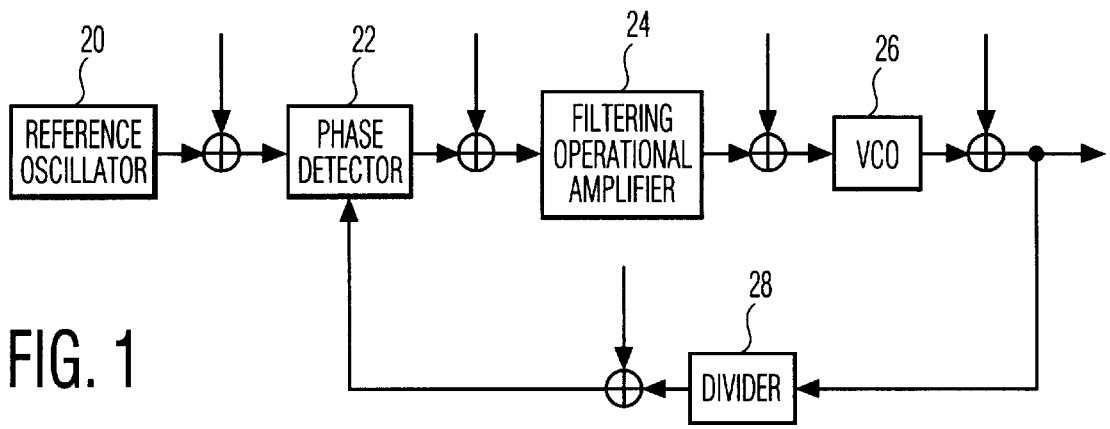
FIG. 1 represents diagrammatically a phase-locked loop circuit used in the prior art receivers.
Figure 2:
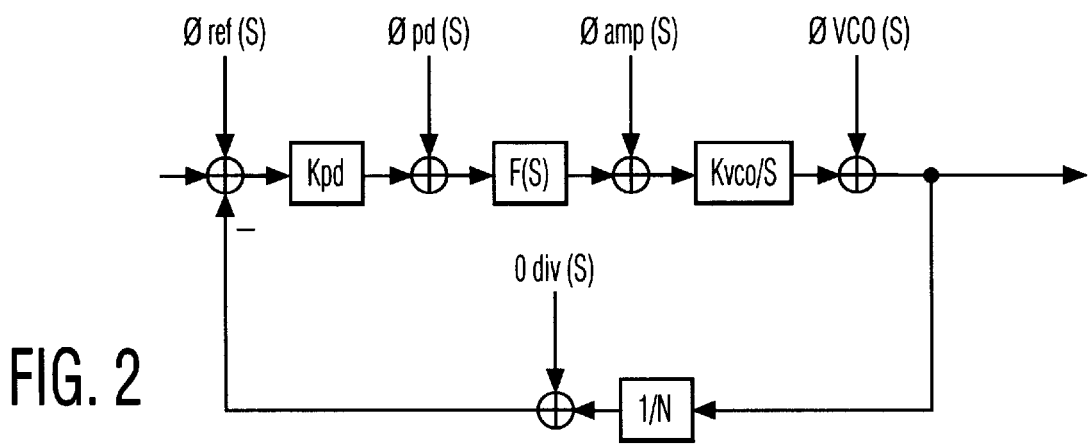
FIG. 2 represents an equivalent diagram of the circuit of FIG. 1.

FIGS. 1 and 2 demonstrate the contribution of each constituent element of the PLL circuit 4. Thus, denoting by $H_{lo}(j\omega)$ the open-loop transfer function of the circuit shown diagrammatically in FIG. 2, the total phase noise is given by the expression:

$$\theta_{tot}(j\omega) = \left|\frac{1}{1-H(j\omega)}\right|^2 \times (\theta_{vco}(j\omega) + \theta_{amp}(j\omega) \times \left(\frac{K_{vco}}{\omega^2}\right) + \theta_{pd}(j\omega) \times \frac{|K_{vco}F(j\omega)|^2}{\omega^2} + \theta_{ref}(j\omega)N^2|H_{lo}(j\omega)|^2 + \theta_{div}(j\omega)|H_{lo}(j\omega)|^2$$

where $\theta_{ref}(j\omega) \, N^2|H_{lo}(j\omega)|^2$ represents the contribution from a reference oscillator 20, and $\theta_{pd}(j\omega)|K_{vco}(j\omega)|^2/\omega^2$ represents the contribution from a phase detector 22, $\theta_{amp}(j\omega)|K_{vco}/\omega)^2$ represents the contribution from a filtering operational amplifier 24, $\theta_{vco}(j\omega)$ represents the contribution from the VCO 26, and $\theta_{div}(j\omega)|H_{lo}(j\omega)|^2$ represents the contribution from a divider 28, with $H_{lo}(j\omega) = \frac{K_{pd}K_{vco}F}{N(j\omega)}$ and with $K_{pd}$ and $-K_{vco}$ respectively representing an amplification coefficient of the phase detector 22 and an amplification coefficient of the VCO 24, $F(j\omega)$ representing the transfer function of the filtering amplifier 24.

By regarding the total phase noise as resulting essentially from the contribution from the VCO 26, the above expression can be simplified and replaced by:

$$\theta'_{tot}(j\omega) = \frac{\theta_{vco}(j\omega)}{|1-H_{lo}(j\omega)|^2} = \theta_{vco}(j\omega)(N\omega)^2 \times \frac{1}{|N(j\omega) + K_{pd}K_{vco}F(j\omega)|^2}$$

Analysis of this expression shows that the total phase noise measurable after the phase detector 22 is given by the expression:

$$\theta''_{tot}(j\omega) = \left(\frac{K_{pd}}{N}\right)\theta_{vco}(j\omega) \times \frac{1}{|1-H_{lo}(j\omega)|^2} \quad (E)$$

$$= \frac{K_{pd}}{N} \cdot \theta'_{tot}(j\omega)$$

It follows that the said phase noise $\theta''_{tot}(j\omega)$ can be measured at an output 23 of the detector 22 by considering the amplification factor $K_{pd}$ of the said phase detector 22 and the division factor N.

According to a preferred embodiment of the invention, represented in FIG. 3 and in FIG. 4, the phase noise correction stage 14 is arranged between a second output 30 of the mixer stage 2 and a second input 32 of the demodulation stage 12 and includes a first analogue/digital converter 34, an input 36 of which is connected to the output 23 of the phase detector 22 integrated with the PLL circuit 4, and an output 42 of which is connected to a calculating module 44 intended for supplying the demodulation stage 12 with a signal $\phi_c(t)$ for compensating the phase noise $\phi_n(t)$.

The first calculating means 44 makes it possible to multiply the value delivered by the analogue/digital converter 34 by the ratio $$\frac{N}{K_{pd}}$$

so as to deliver at its output 45 a compensation signal $\theta_c(t)$ equivalent to the noise signal $\theta'_n(t)$.

As may be seen in FIG. 4, the demodulation stage 12 includes a second calculating module 50 intended for determining the phase $\omega t$ signal $S_{FI}(t)$ received from the mixer stage 2. The said calculating module 50 has a first output 52 connected to a first input 54 of a synchronous demodulator block 56 and a second output 58 connected to a subtractor 60 simultaneously receiving the compensation signal $\phi_c(t)$ at an input 62 and delivering to the demodulator block 56 the difference $\Delta\phi$ given by the expression:

$$\Delta\phi = \omega_{FI}t - \phi_c(t).$$

The calculating module 50 includes a second analogue/digital converter (64) associated with a filter 68 known per se making it possible to recover the instantaneous phase of a signal.

As is represented in FIG. 4, the mixer stage 2 of the receiver includes a first multiplier 72, a first input 74 of which receives from the antenna 7, via an amplification/filtering means 76, a radiofrequency carrier $S_{RF}(t)$ given by the expression:

$$S_{RF}(t) = S_p(t)\cos \omega_o t + S_q(t)\sin \omega_o t$$

where $S_p(t)$ and $S_q(t)$ respectively represent an in-phase component and a quadrature component of a QPSK signal or of a QAM signal. A second input 78 of the said multiplier 72 receives a signal $S_{lo}(t)$ generated by the PLL circuit 4, whilst an output 80 of the said multiplier 72 delivers the signal $S_{FI}(t)$ to the demodulation stage 12 via a first low-pass filter 82.

As may be seen in FIG. 4, the demodulator block 56 includes a semi-Nyquist filter 83 connected to the second analogue/digital converter 64, a second multiplier 84 and a third multiplier 86 having, respectively, on the one hand, a first input 88 and a first input 90 which are connected to an output 92 of the said semi-Nyquist filter 83, and on the other hand, respectively, a second input 94 and a second input 96 which are connected to a storage means 100 intended for storing the phase difference $\Delta\phi$. The second multiplier 84 delivers, via a low-pass filter 102, a demodulated in-phase component $$S_{Id}(t) = S_{FI}(t) \times 2\cos (\omega_{FI}(t) - \phi_c(t))$$

whilst the third multiplier 86 delivers, via a second low-pass filter 104, a demodulated quadrature component $$S_{Qd}(t) = S_{FI}(t) \times 2\sin(\omega_{FI}(t) - \phi_c(t)).$$

Thus, when the modulated carrier $S_{RF}(t)$ is received by the mixer stage 2, it is converted into an intermediate-frequency signal $S_{FI}(t)$ given by the expression:

$$S_{FI}(t) = S_p(t)[\cos((\omega_o + \omega_{lo})t + \phi_n(t)) + \cos((\omega_o - \omega_{lo})t - \phi_n(t))] + S_q(t)[\sin((\omega_o + \omega_{lo})t + \phi_n(t)) + \sin((\omega_o - \omega_{lo})t - \phi_n(t))]$$

After filtering, the signal gathered is given by the expression:

$$S_{FFI}(t) = S_p(t)\cos((\omega_o - \omega_{lo})t - \phi_n(t)) + S_q(t)\sin((\omega_o - \omega_{lo})t - \phi_n(t))$$

or, putting $\omega_o - \omega_{lo} = \omega_{FI}$ $$S_{FFI}(t) = S_p(t)\cos(\omega_{FI} \cdot t - \phi_n(t)) + S_q(t)\sin (\omega_{FI} \cdot t - \phi_n(t))$$

the signal $S_{FFI}(t)$ is next applied to the demodulator stage 12 so as to gather the demodulated in-phase component $S_{Id}(t)$ and the demodulated quadrature component $S_{qd}(t)$.

The demodulated in-phase component is given by the expression:

$$S_{Id} = S_{FFI}(t) 2\cos(\omega_{FI} \cdot t - \phi_c(t))$$

$$S_{Id} = S_p(t)[\cos(2\omega_{FI}(t) - \phi_n(t) - \phi_c(t)) + \cos(-\phi_n(t) + \phi_c(t))] + S_q(t)[\sin(2\omega_{FI} - \phi_c(t)) + \sin(-\phi_n(t) + \phi_c(t))]$$

i.e., after filtering by the low-pass filter 102:

$$S_{FId}(t) = S_p(t)\cos(-\phi_n(t) + \phi_c(t)) + S_q(t)\sin(-_n(t) + \phi_c(t))$$

Likewise, the demodulated quadrature component is given by the expression:

$$S_{Qd}(t) = S_{FFI}(t) \cdot 2\sin(\omega_{FI}(t) - \phi_c(t))$$

$$S_{Qd}(t) = S_p(t) \cdot [\sin(2\omega_{FI}(t) - \phi_n(t) - \phi_c(t)) + \sin(\phi_n(t) - \phi_c(t))] + S_q(t)[-\cos(2\omega_{FI} \cdot t - \phi_n(t) - \phi_c(t)) + \cos(-\phi_n(t) + \phi_c(t))]$$

i.e. after filtering by the low-pass filter 104:

$$S_{FQd}(t) = S_p(t)\sin(\phi_n(t) - \phi_c(t)) + S_q(t)\cos(-\phi_n(t) + \phi_c(t))$$

with $$\Delta\phi = \phi_n(t) - \phi_c(t)$$

hence $$S_{FId}(t) = S_p(t)\cos(\Delta\phi(t)) + S_q(t)\sin(\Delta\phi(t))$$

and $$S_{FQd}(t) = -S_p(t)\sin(\Delta\phi(t)) + S_q(t)\cos(\Delta\phi(t))$$

Ideally, the phase noise $\phi_n(t)$ is equal to the compensation noise $\phi_c(t)$ calculated in the correction stage 14.

In this case:

$$S_{FId}(t) = S_p(t) \text{ and } S_{FQd}(t) = S_q(t)$$

What is claimed is:

1. Digital receiver including a mixer stage receiving a carrier S(t) and delivering to a demodulation stage and intermediate-frecuency signal $S_{FI}(t)$ obtained by combining the carrier received and a signal generated by a PLL circuit comprising:

a phase noise digital correction stage intended for tapping off a noise signal $\phi_n(t)$ generated by the PLL circuit in the mixer stage and for compensating the said noise $\phi_n(t)$ in the demodulation stage;

the phase noise correction stage including a first analogue/digital converter, and input of which is connected to an output of a phase detector integrated with the PLL circuit, and an output of which is connected to a calculating module intended for supplying the demodulation stage with a signal $\phi_c(t)$ for compensating the phase noise $\phi_n(t)$, wherein the demodulation stage includes a second calculating module intended for determining the phase $\omega_{FI}.t$ of the signal $S_{FI}(t)$, having a first output connected to a first input of a demodulator block and a second output connected to a subtractor; said subtractor receives the signal $\phi_c(t)$ at an input and delivers the difference $\Delta\phi = \phi_{FI}.t - \phi_c(t)$ to the demodulator block.

2. The receiver according to claim 1, wherein the second calculating module includes a second analogue/digital converter associated with a filter.

3. The receiver according to claim 1, wherein the mixer stage includes a multiplier whose first input is connected to an antenna for receiving an RF carrier given by the expression:

$$S_{RF}(t) = S_p(t) \text{Cos } \omega.t + S_q(t) \text{Sin } \omega.t$$

or $S_p(t)$ and $S_q(t)$
respectively represent an in-phase component and a quadrature component of a QPSK signal or of a QAM signal, a second input of said multiplier is connected to the PLL circuit delivering a signal $S_{lo}(t)$ with angular frequency $\omega_{Lo}$, said multiplier delivering the signal $S_{PI}(t)$ via a filtering means.

4. The receiver according to claim 1, wherein the demodulator block includes a semi-Nyquist filter connected, on the one hand, to the second analogue/digital converter and, on the other hand, to a first multiplier and to a second multiplier, each of said multipliers is connected to a storage means; the first multiplier delivering, via a low-pass filter, a demodulated in-phase component:

$$S_{Id}(t) = S_{FI}(t) \times 2\text{Cos}(\omega_{FI}t - \phi_c(t))$$

and the second multiplier delivering, via a low-pass filter, a demodulated quadrature component $$S_{Qd}(t) = S_{FI}(t) \times 2\text{Sin}(\omega_{FI}t - \phi_c(t)).$$

* * * * *